United States Patent
Chen et al.

(10) Patent No.: US 12,360,410 B2
(45) Date of Patent: Jul. 15, 2025

(54) SELF-POWERED DISPLAY DEVICE

(71) Applicant: Iris Optronics Co., Ltd., Tainan (TW)

(72) Inventors: Chih Wei Chen, Hsinchu County (TW); Chi Chang Liao, Tainan (TW)

(73) Assignee: Iris Optronics Co., Ltd., Tainan (TW)

( * ) Notice: Subject to any disclaimer, the term of this patent is extended or adjusted under 35 U.S.C. 154(b) by 0 days.

(21) Appl. No.: 18/757,556

(22) Filed: Jun. 28, 2024

(65) Prior Publication Data

US 2025/0123510 A1  Apr. 17, 2025

(30) Foreign Application Priority Data

Oct. 16, 2023 (TW) ................................ 112139447

(51) Int. Cl.
  *G02F 1/133* (2006.01)
(52) U.S. Cl.
  CPC ...... *G02F 1/13324* (2021.01); *G02F 2203/01* (2013.01)
(58) Field of Classification Search
  CPC .......................... G02F 1/13324; G02F 2203/01
  See application file for complete search history.

(56) References Cited

U.S. PATENT DOCUMENTS

| | | | |
|---|---|---|---|
| 2007/0164980 A1* | 7/2007 | Manning | G06F 3/147 345/104 |
| 2012/0105780 A1 | 5/2012 | Jhan et al. | |
| 2016/0147100 A1 | 5/2016 | Van Oosten et al. | |
| 2019/0196773 A1 | 6/2019 | Miles et al. | |

FOREIGN PATENT DOCUMENTS

| | | |
|---|---|---|
| CN | 209343209 U | 9/2019 |
| CN | 113419392 A | 9/2021 |
| EP | 1143311 A1 | 10/2001 |
| TW | 201435465 A | 9/2014 |
| WO | 01/18776 A2 | 3/2001 |

\* cited by examiner

*Primary Examiner* — Anne M Hines
(74) *Attorney, Agent, or Firm* — CKC & Partners Co., LLC

(57) ABSTRACT

A self-powered display device is proposed, and includes a light-transmitting panel and a photoelectric converting module. The light-transmitting panel has a display region for allowing light to penetrate. The photoelectric converting module is electrically connected to the light-transmitting panel. The photoelectric converting module has a power generation region for absorbing the light penetrating the display region, and the photoelectric converting module converts the light into an electrical energy through the power generation region to provide the electrical energy to the light-transmitting panel. The light-transmitting panel is spaced apart from the photoelectric converting module, and a projected area of the display region on the power generation region is larger than an area of the power generation region.

11 Claims, 6 Drawing Sheets

SELF-POWERED DISPLAY DEVICE

RELATED APPLICATIONS

This application claims priority to Taiwan Application Serial Number 112139447, filed Oct. 16, 2023, which is herein incorporated by reference.

BACKGROUND

Technical Field

The present disclosure relates to a field of display technology. More particularly, the present disclosure relates to a self-powered display device.

Description of Related Art

In addition to reflecting ambient light to provide an image, one of the characteristics of a transflective panel (such as a cholesteric liquid crystal panel) is to allow part of ambient light to penetrate to the bottom of the transflective panel. By combining a solar device at the bottom, the transflective panel can make full use of ambient light to achieve its self-powered function. However, as the sunlight changes (such as morning to dusk), the incident angles of ambient light will be different, and the effective power generation area for ambient light which penetrates the cholesteric liquid crystal panel to the solar device will change accordingly. Based on changes in sunlight, the amount of ambient light radiation will also be different, and only part of the energy will penetrate the cholesteric liquid crystal panel to the solar device at the same time, resulting in lower effective energy utilization.

When the elevation angle of the sun in the sky changes, the refraction angle of ambient light after entering the cholesteric liquid crystal panel also changes. Before reaching the solar device, ambient light passes through various media (such as air, glass, plastic, optical glue or panel process materials), and the media with different refractive index will also affect an optical path. As the optical path changes, the equivalent incident energy also changes. Although the larger the area of the solar device, the larger the area over which the solar device can collect more energy. However, if a part of the solar device is shaded, the shaded part will still be unable to effectively generate full electricity, resulting in the reduction in the overall power generation of the solar device.

In view of this, developing a self-powered display device that can take into account changes in ambient light and ensure that the effective power generation area is not affected has become an urgent problem that related industries want to solve currently.

SUMMARY

According to one aspect of the present disclosure, a self-powered display device includes a light-transmitting panel and a photoelectric converting module. The light-transmitting panel has a display region for allowing a light to penetrate. The photoelectric converting module is electrically connected to the light-transmitting panel eventually. The photoelectric converting module has a power generation region for absorbing the light penetrating the display region, and the photoelectric converting module converts the light into an electrical energy through the power generation region to provide the electrical energy to the light-transmitting panel. A projected area of the display region on the power generation region is larger than an area of the power generation region.

According to another aspect of the present disclosure, a self-powered display device includes a housing, a light-transmitting panel and a photoelectric converting module. The housing forms an accommodation space. The light-transmitting panel is disposed in the accommodation space and has a display region for allowing a light to penetrate. The photoelectric converting module is disposed in the accommodation space and electrically connected to the light-transmitting panel eventually. The photoelectric converting module has a power generation region for absorbing the light penetrating the display region, and the photoelectric converting module converts the light into an electrical energy through the power generation region to provide the electrical energy to the light-transmitting panel. The light-transmitting panel is spaced apart from the photoelectric converting module.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiment will be described with the drawings. For clarity, some practical details will be described below. However, it should be noted that the present disclosure should not be limited by the practical details, that is, in some embodiment, the practical details is unnecessary. In addition, for simplifying the drawings, some conventional structures and elements will be simply illustrated, and repeated elements may be represented by the same labels.

It will be understood that when an element (or device) is referred to as be "connected" to another element, it can be directly connected to the other element, or it can be indirectly connected to the other element, that is, intervening elements may be present. In contrast, when an element is referred to as be "directly connected to" another element, there are no intervening elements present. In addition, the terms first, second, third, etc. are used herein to describe various elements or components, these elements or components should not be limited by these terms. Consequently, a first element or component discussed below could be termed a second element or component.

Figure 1:
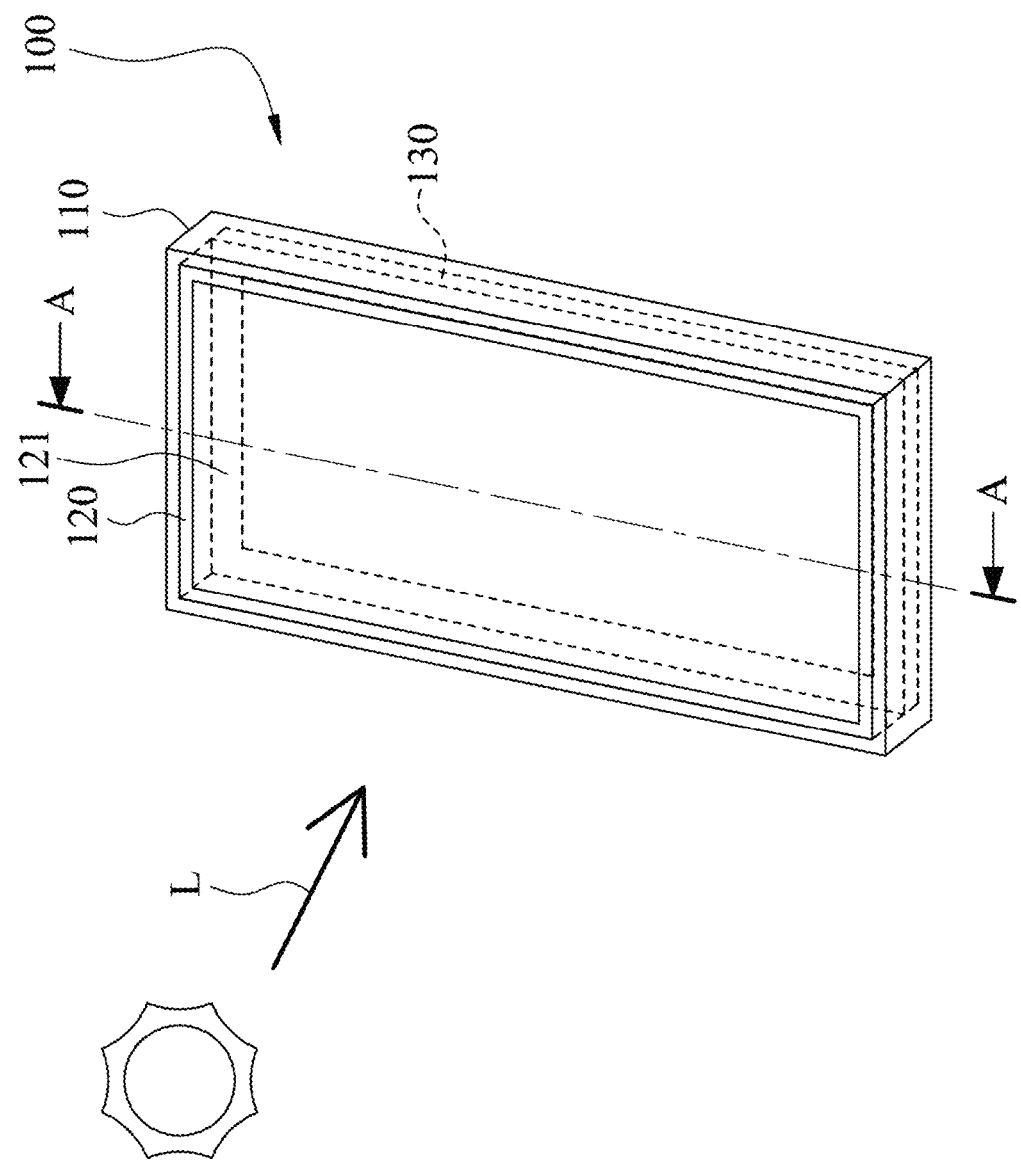
FIG. 1 shows a three-dimensional perspective view of a self-powered display device according to a first embodiment of the present disclosure.
Figure 2:
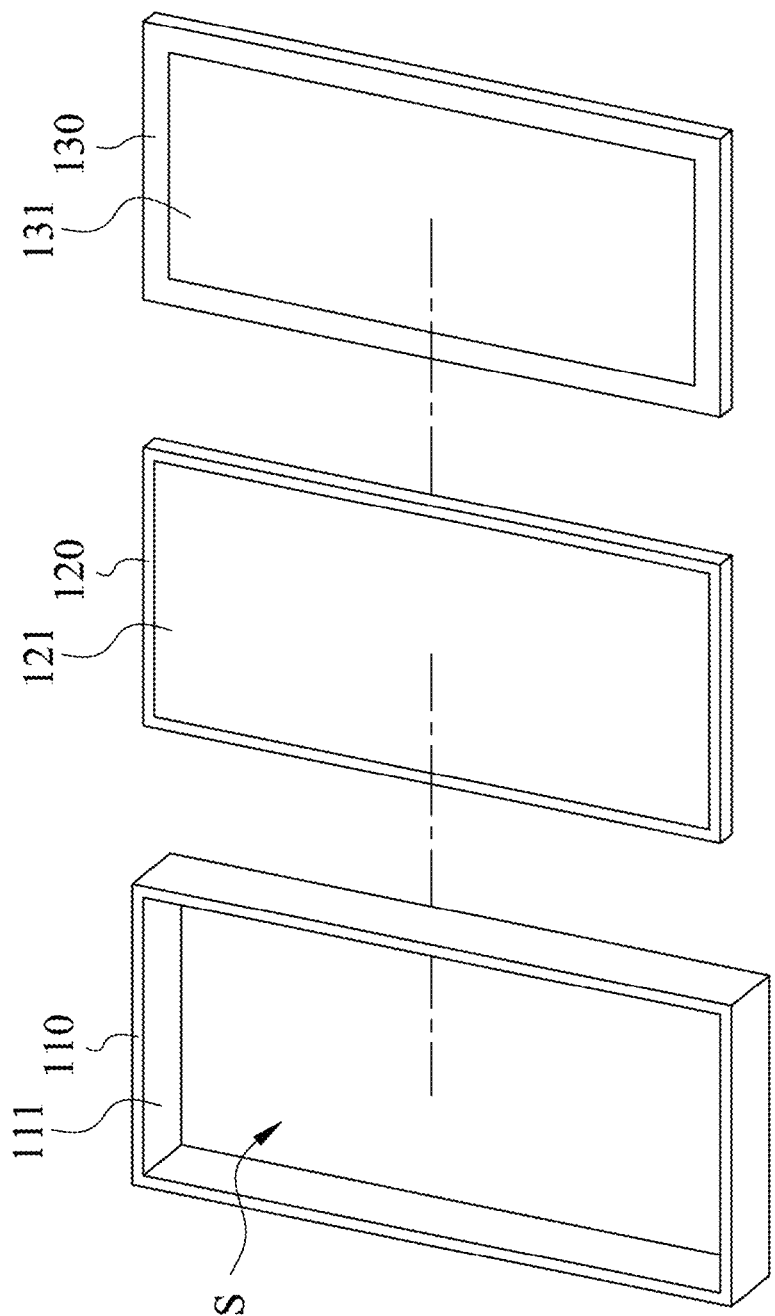
FIG. 2 shows an exploded view of the self-powered display device shown in FIG. 1.

Please refer to FIGS. 1 and 2. FIG. 1 shows a three-dimensional perspective view of a self-powered display device 100 according to a first embodiment of the present disclosure. FIG. 2 shows an exploded view of the self-powered display device 100 shown in FIG. 1. The self-powered display device 100 includes a housing 110, a light-transmitting panel 120 and a photoelectric converting module 130. The light-transmitting panel 120 and the photoelectric converting module 130 are both disposed in the housing 110. The light-transmitting panel 120 has a display region 121, which is configured to reflect a light L to provide an image and also allows part of the light L to penetrate. The photoelectric converting module 130 is electrically connected to the light-transmitting panel 120 eventually. The photoelectric converting module 130 is electrically connected to the light-transmitting panel 120 via wires and battery (not shown) installed in the housing 110, and has a power generation region 131 for absorbing the light L penetrating the display region 121. The power generation region 131 is located opposite the display region 121. The photoelectric converting module 130 converts the light L into an electrical energy through the power generation region 131, and provides the electrical energy through the wires and battery to the light-transmitting panel 120 for displaying the image at the same time, so that the self-powered display device 100 can have a self-powered function. A projected area of the display region 121 on the power generation region 131 is larger than an area of the power generation region 131. Thus, the self-powered display device 100 of the present disclosure can avoid the shading phenomenon of the light-transmitting panel 120, thereby improving the power generation efficiency of the photoelectric converting module 130.

Specifically, the housing 110 can be an annular frame, which forms an accommodation space S. The light-transmitting panel 120 and the photoelectric converting module 130 are both disposed in the accommodation space S. In addition, the housing 110 has an opening 111 that exposes the display region 121 of the light-transmitting panel 120, so that the display region 121 can present the image content through the opening 111. In other embodiments, the housing can also be divided into a front housing and a rear housing. The front housing is provided with an opening, and the display region fits the opening. The rear housing covers the front housing to form an accommodation space for the light-transmitting panel and the photoelectric converting module to be accommodated inside the housing.

The light-transmitting panel 120 can be, but is not limited to, a cholesteric liquid crystal panel (also known as, a cholesteric liquid crystal display (ChLCD)), a transflective liquid crystal panel, a transparent organic light-emitting diode (OLED) panel, a transparent light-emitting diode (LED) panel, or other panels that have display functions and allow ambient light to pass through as well. The photoelectric converting module 130 can be, but is not limited to, a crystalline silicon solar cell, a thin-film solar cell, an organic solar cell (also known as, an organic photovoltaic (OPV) cell), a perovskite solar cell (PSC), a dye-sensitized solar cell (DSSC), or other solar cells that can convert ambient light into electrical energy.

The layered structures inside the various panels mentioned above can contain different dielectric materials, and their thicknesses can also be different. The light L can be sunlight, so changes in its incident angle over time will result in differences in an effective power generation area reaching the photoelectric converting module 130. In response to changes in a thickness and an incident angle, in order to avoid the light-transmitting panel 120 from shading the photoelectric converting module 130 and limiting the power generation, it can be concluded that changes in the horizontal optical path of the light L is less than 80% of the vertical optical transmission path of the light L in the light-transmitting panel 120. Therefore, in the configuration of the self-powered display device 100, the area of the power generation region 131 is smaller than an area of the display region 121, and a ratio of the area of the power generation region 131 to the area of the display region 121 can be between 75% and 99%. In detail, the area of the power generation region 131 is the effective power generation area of the photoelectric converting module 130. It actually refers to the total power generation area of each region with the power generation function, and that needs to deduct the areas of non-power generation regions (such as insulation region, forbidden region, and wire region) and is not purely calculated based on the peripheral size of the photoelectric converting module 130. The area of the display region 121 is an active area of the light-transmitting panel 120.

Figure 3:
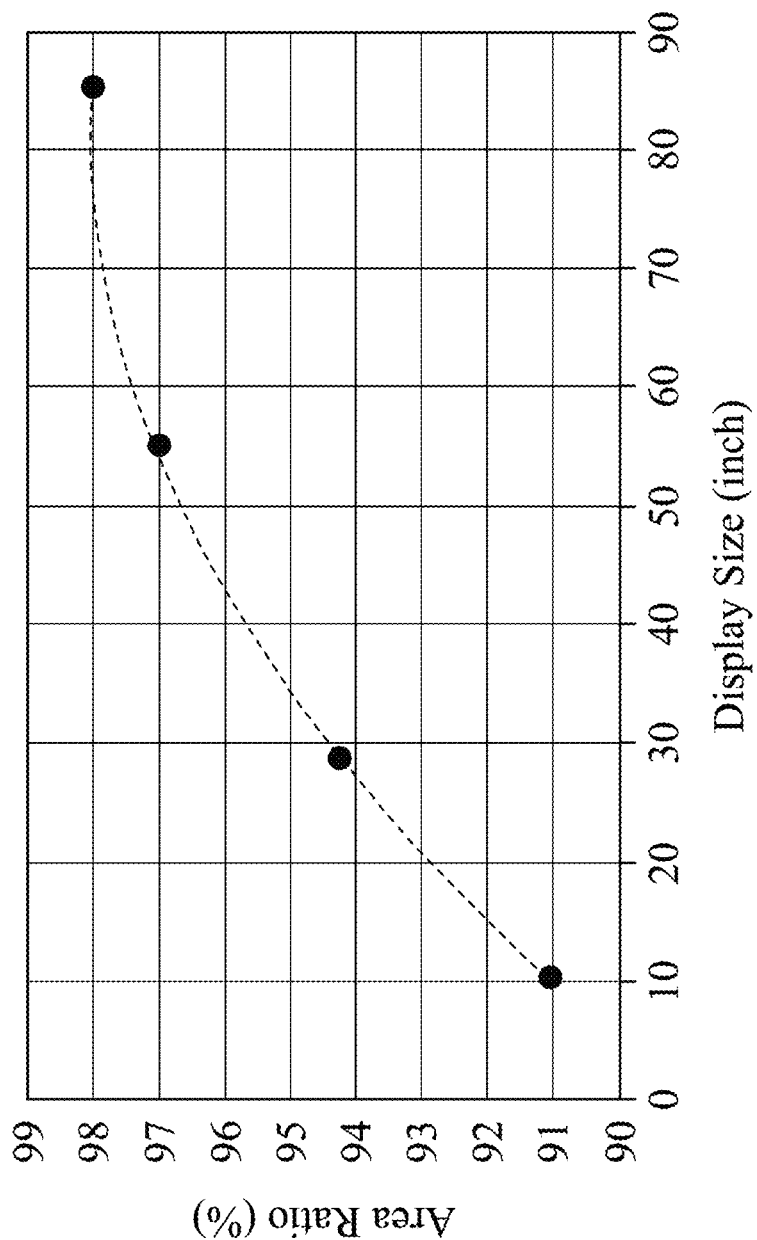
FIG. 3 is a curve comparison diagram illustrating a display size of a light-transmitting panel and an area ratio between a power generation region and a display region according to the present disclosure.

Please continue to refer to FIG. 3. FIG. 3 is a curve comparison diagram illustrating a display size of the light-transmitting panel 120 and an area ratio between the power generation region 131 and the display region 121 according to the present disclosure. In addition to measuring the optical path changes caused by Snell's Law in geometric optics, the impact of manufacturing and assembly tolerances on the power generation region 131 must also be considered. Taking the light-transmitting panel 120 as a 28.5 inches cholesteric liquid crystal panel for example, the area of the power generation region 131 is A1, and the area of the display region 121 is A2. When the effective incident angle of ambient light is 45 degrees, the following condition can be satisfied: $94\% \leq A1/A2 \leq 95\%$. As shown in FIG. 3, since the display size of the light-transmitting panel 120 varies depending on the thickness of the panel material, the manufacturing and assembly process, the area ratio (A1/A2) between the power generation region 131 and the display region 121 in the present disclosure only needs to satisfy the following condition: $90\% \leq A1/A2 \leq 99\%$.

Figure 4:
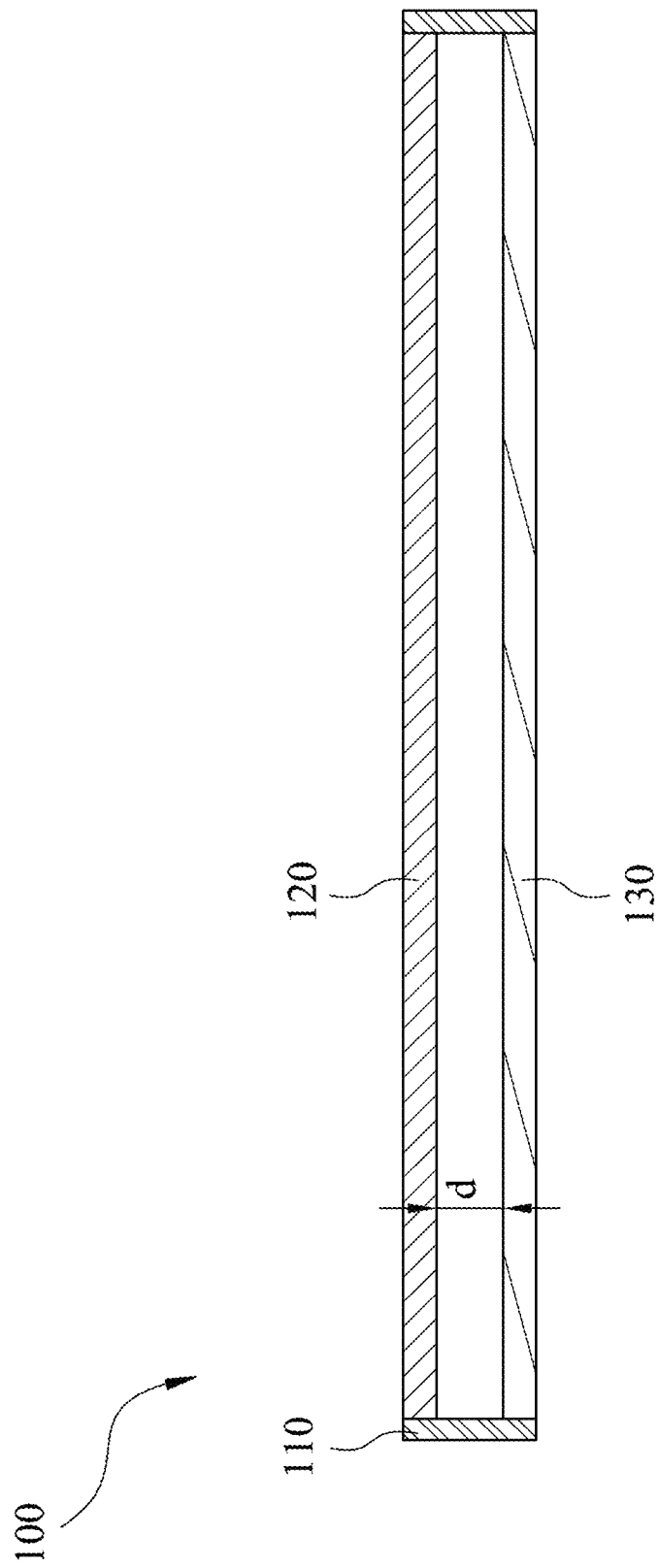
FIG. 4 shows a cross-sectional view of the self-powered display device along the section line A-A shown in FIG. 1.

Please continue to refer to FIG. 4. FIG. 4 shows a cross-sectional view of the self-powered display device 100 along the section line A-A shown in FIG. 1. Based on consideration of the heat dissipation problem between the light-transmitting panel 120 and the photoelectric converting module 130, in order to promote the hot air convection for the purpose of thermal management, the light-transmitting panel 120 is spaced apart from the photoelectric converting module 130. Further, based on the arrangement of the light-transmitting panel 120 and the photoelectric converting module 130 being spaced apart, after the light L penetrates the light-transmitting panel 120, the present disclosure needs to consider that the light L still have to penetrate the air medium before reaching the photoelectric converting module 130. Therefore, there is a separation distance d between the light-transmitting panel 120 and the photoelectric converting module 130, and the separation distance d is less than or equal to 5 cm and preferably less than or equal to 3 cm. Therefore, the arrangement of the separation distance d can not only improve the overall thermal energy management of the self-powered display device 100 and reduce the thermal energy interference between the light-transmitting panel 120 and the photoelectric converting module 130, but also achieve higher power generation efficiency while allowing the energy attenuation caused by the air medium.

Furthermore, the light L often does not come directly from a highly directional light source (such as sunlight), and can be generated by scattering and reflection caused by the environment. Part of the light L is scattered by the air medium after penetrating the light-transmitting panel 120, what situation is similar to the scattering effect of sunlight. It can be considered that sunlight does not change significantly with the incident angle at a specific angle. Therefore, considering the changes of energy of the light L under Snell's Law, the scattering effect and after penetrating the light-transmitting panel 120, the present disclosure takes the incident angle of 30 degrees to 75 degrees applied to the 28.5 inches cholesteric liquid crystal panel as an example, and the optimal separation distance d can be less than or equal to 3 cm, thereby maintaining better power generation efficiency.

Figure 5:
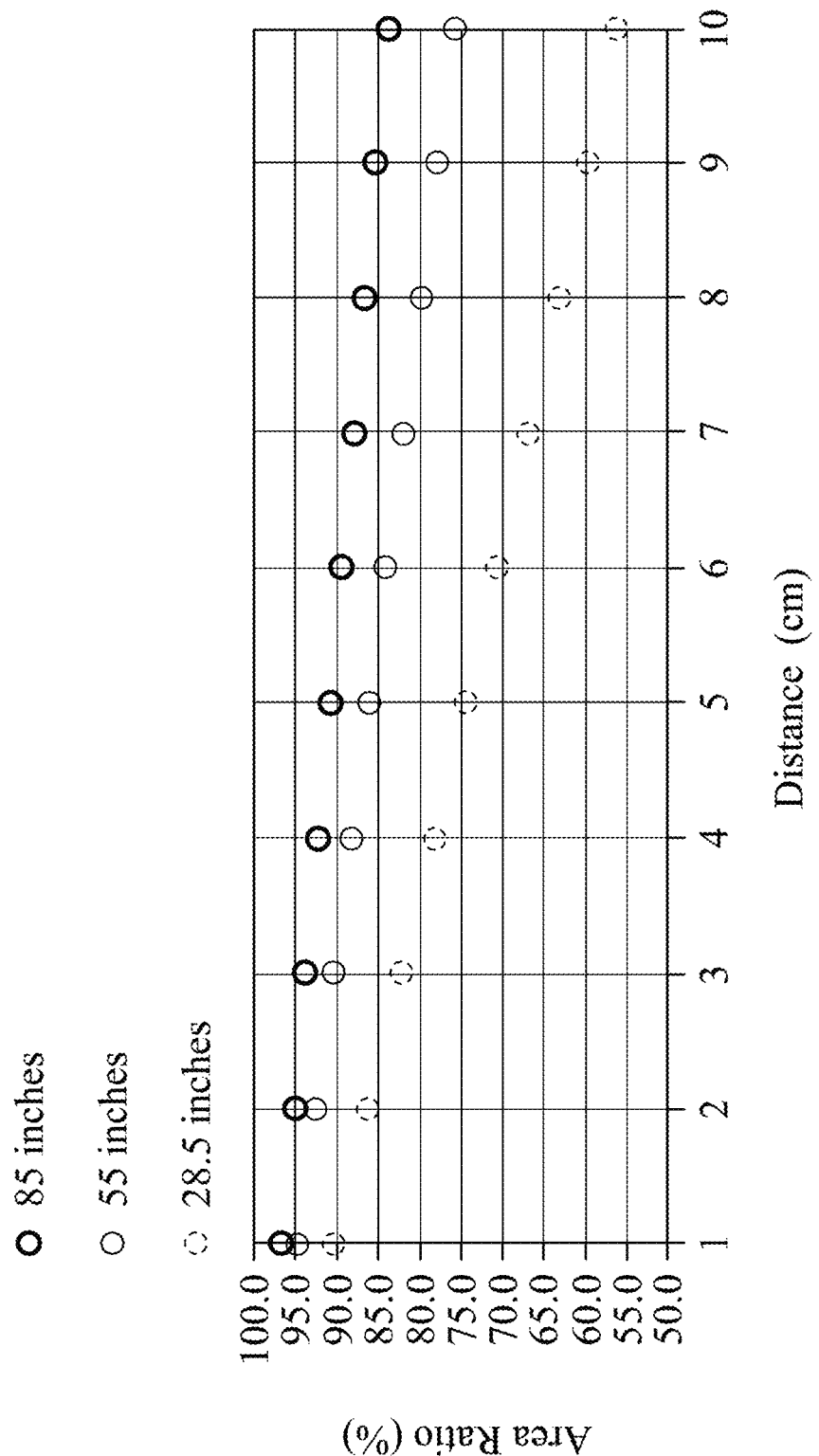
FIG. 5 is a curve comparison diagram illustrating a separation distance between the light-transmitting panel and a photoelectric converting module and the area ratio between the power generation region and the display region according to the present disclosure.

Please continue to refer to FIG. 5. FIG. 5 is a curve comparison diagram illustrating the separation distance d between the light-transmitting panel 120 and the photoelectric converting module 130 and the area ratio between the power generation region 131 and the display region 121 according to the present disclosure. For example, the light-transmitting panel 120 is each of 28.5 inches, 55 inches and 85 inches cholesteric liquid crystal panels. In detail, when the area ratio is 90%, the separation distance d should be maintained within 1 cm. However, if the separation distance d is increased, the area ratio will decrease as the optical path changes. Therefore, the area ratio between the power generation region 131 and the display region 121 (i.e., the ratio of the area of the power generation region 131 to the area of the display region 121) in the present disclosure is 75%, which is the lowest acceptable range. Based on the fact that the display size of the light-transmitting panel 120 varies depending on the thickness of the panel material, the manufacturing and assembly process, and considering thermal energy management requirements, the separation distance d between the light-transmitting panel 120 and the photoelectric converting module 130 is under the condition of less than or equal to 5 cm, the ratio of the area of the power generation region 131 to the area of the display region 121 can be between 75% and 99%. In other embodiments, the light is not limited to sunlight. When the self-powered display device of the present disclosure is used indoors, since there is still an incident angle relationship between ambient light (e.g., LED light) and the light-transmitting panel, the above optimization configuration principle is also applicable.

Figure 6:
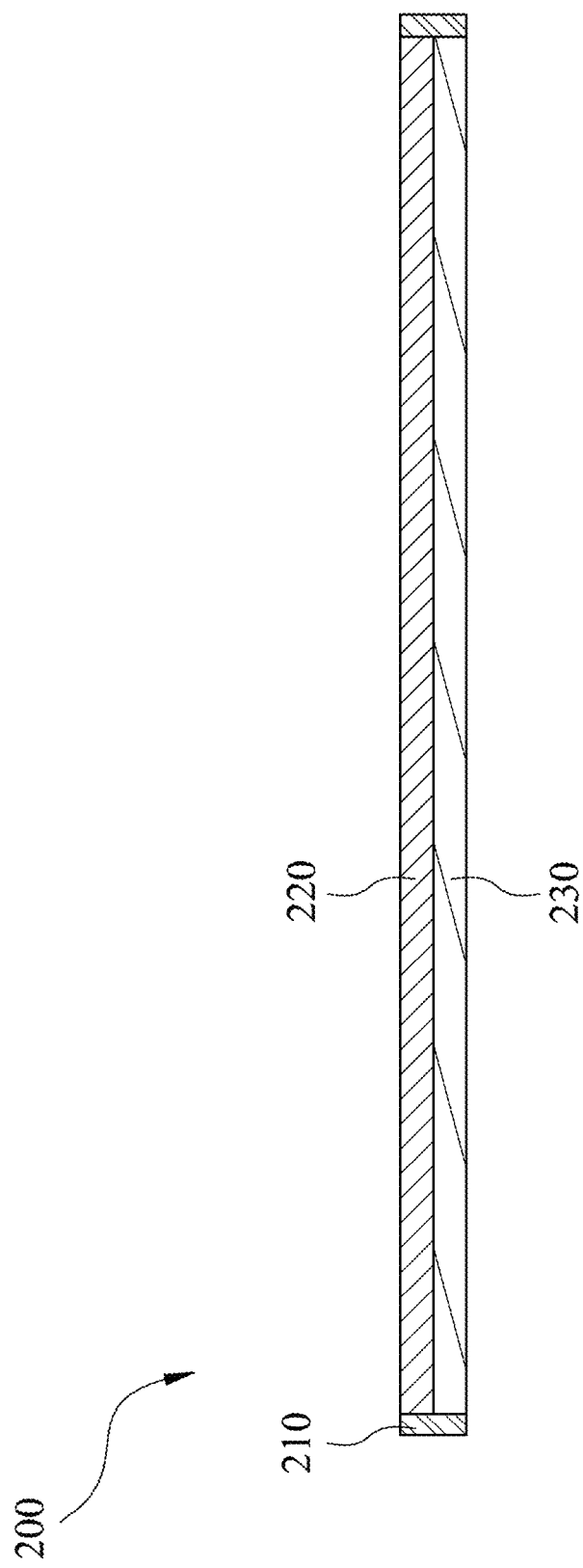
FIG. 6 shows a cross-sectional view of a self-powered display device according to a second embodiment of the present disclosure.

Please refer to FIG. 6. FIG. 6 shows a cross-sectional view of a self-powered display device 200 according to a second embodiment of the present disclosure. The self-powered display device 200 includes a housing 210, a light-transmitting panel 220 and a photoelectric converting module 230. The difference from the first embodiment is that in the housing 210 of the self-powered display device 200, the light-transmitting panel 220 is disposed adjacent to the photoelectric converting module 230. Specifically, an adhesive layer with high transmittance, such as optical clear adhesive (OCA), can be disposed between the light-transmitting panel 220 and the photoelectric converting module 230. Since the thickness of the adhesive layer is only between tens to hundreds of microns, it can be ignored. Therefore, the light-transmitting panel 220 and the photoelectric converting module 230 are closely adhered to each other.

In the optical path of light from the light-transmitting panel 220 to the photoelectric converting module 230, the light needs to pass through various media (such as air, glass, plastic, optical glue or panel process materials), and the optical path is affected by the media with different refractive index. Sometimes in order to pursue image quality, the optical glue is appropriately used between the light-transmitting panel 220 and the photoelectric converting module 230 to avoid interface reflection caused by changes in the refractive index of the air medium, thereby reducing light penetration loss. In addition, the arrangement conditions of the area ratio between the display region and the power generation region are the same as those in the first embodiment, and not be described again herein.

In summary, the present disclosure has the following advantages. First, it can ensure that the effective power generation area is not affected by the shading phenomenon, thereby maintaining better power generation efficiency. Second, by arranging the separation distance between the light-transmitting panel and the photoelectric converting module, besides achieving thermal management purposes, it can reduce thermal interference between the light-transmitting panel and the photoelectric converting module.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A self-powered display device, comprising:
   a light-transmitting panel having a display region for allowing a light to penetrate; and
   a photoelectric converting module electrically connected to the light-transmitting panel, wherein the photoelectric converting module has a power generation region for absorbing the light penetrating the display region, and the photoelectric converting module converts the light into an electrical energy through the power generation region to provide the electrical energy to the light-transmitting panel;
   wherein a projected area of the display region on the power generation region is larger than an area of the power generation region.

2. The self-powered display device of claim 1, wherein a ratio of the area of the power generation region to an area of the display region is between 75% and 99%.

3. The self-powered display device of claim 1, wherein the light-transmitting panel is spaced apart from the photoelectric converting module.

4. The self-powered display device of claim 3, wherein there is a separation distance between the light-transmitting panel and the photoelectric converting module, and the separation distance is less than or equal to 5 cm.

5. The self-powered display device of claim 1, wherein the light-transmitting panel is disposed adjacent to the photoelectric converting module.

6. The self-powered display device of claim 1, wherein the light-transmitting panel is a cholesteric liquid crystal panel, a transflective liquid crystal panel, a transparent organic light-emitting diode panel or a transparent light-emitting diode panel.

7. The self-powered display device of claim 1, wherein the photoelectric converting module is a crystalline silicon solar cell, a thin-film solar cell, an organic solar cell, a perovskite solar cell or a dye-sensitized solar cell.

8. The self-powered display device of claim 1, wherein the light-transmitting panel and the photoelectric converting module are disposed in a housing, and the housing has an opening that exposes the display region of the light-transmitting panel.

9. A self-powered display device, comprising:
a housing forming an accommodation space;
a light-transmitting panel disposed in the accommodation space and having a display region for allowing a light to penetrate; and
a photoelectric converting module disposed in the accommodation space and electrically connected to the light-transmitting panel, wherein the photoelectric converting module has a power generation region for absorbing the light penetrating the display region, and the photoelectric converting module converts the light into an electrical energy through the power generation region to provide the electrical energy to the light-transmitting panel;
wherein the light-transmitting panel is spaced apart from the photoelectric converting module;
wherein an area of the power generation region is smaller than an area of the display region.

10. The self-powered display device of claim 9, wherein there is a separation distance between the light-transmitting panel and the photoelectric converting module, and the separation distance is less than or equal to 5 cm.

11. The self-powered display device of claim 9, wherein a ratio of the area of the power generation region to the area of the display region is between 75% and 99%.

* * * * *